(No Model.)
W. A. LORENZ.
VELOCIPEDE.
No. 298,217. Patented May 6, 1884.
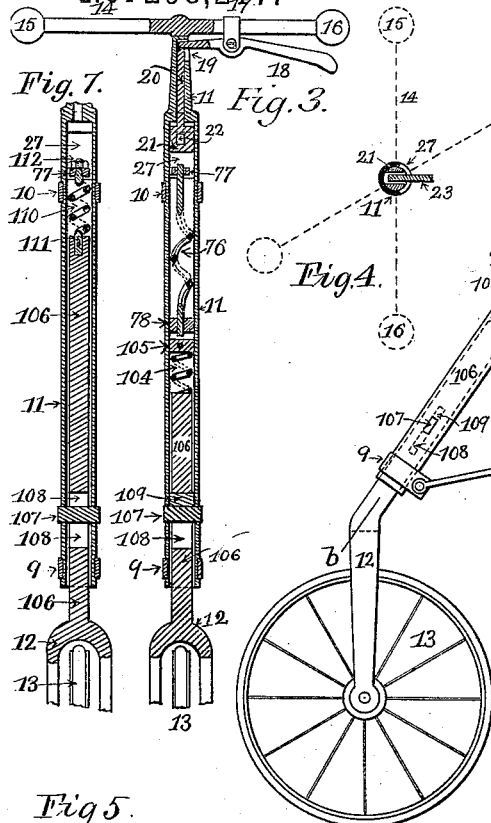
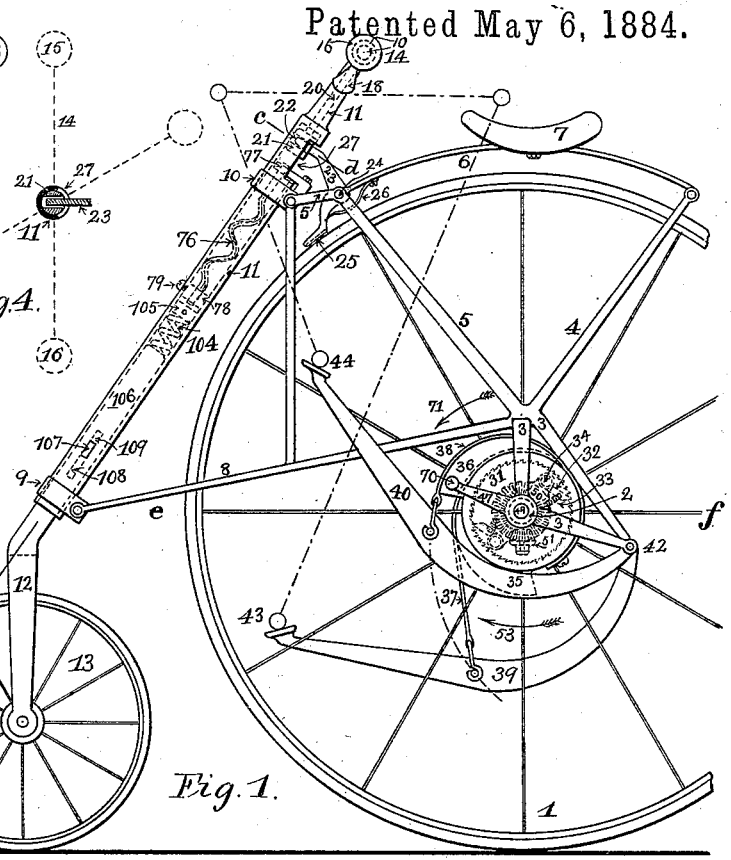
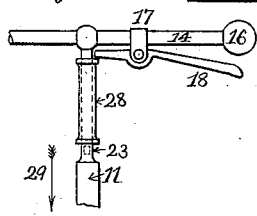
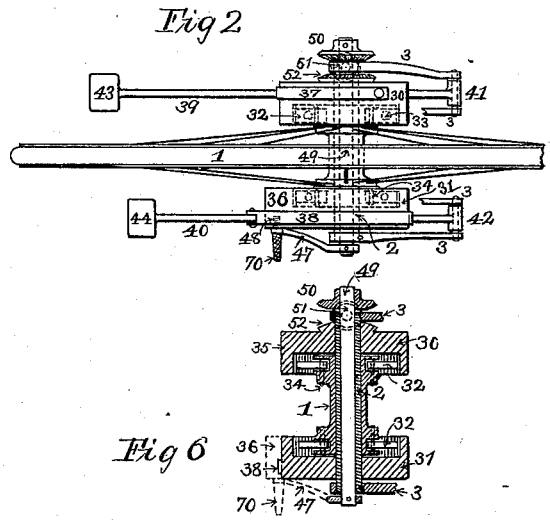
Witnesses:
S. W. Powel
W. H. House
Inventor:
William A. Lorenz

UNITED STATES PATENT OFFICE.

WILLIAM A. LORENZ, OF HARTFORD, CONNECTICUT.

VELOCIPEDE.

SPECIFICATION forming part of Letters Patent No. 298,217, dated May 6, 1884.

Application filed September 1, 1883. (No model.)

*To all whom it may concern:*

Be it known that I, WILLIAM A. LORENZ, a citizen of the United States, residing at Hartford, in the county of Hartford, State of Connecticut, have invented new and useful Improvements in Bicycles, of which the following is a specification.

My invention relates principally to improvements in bicycles which are propelled by treadles, the objects being, first, to provide a more convenient brake than those hitherto in use; second, to afford a more easily operated treadle-movement; third, to provide an improved step that shall render mounting easier; fourth, to provide an attachment whereby the steering is made partially self-acting; fifth, to provide a buffer that shall take the shocks given to the steering-wheel. I attain these objects by the mechanism illustrated in the accompanying drawings, in which—

Figure 1 is a side view of a bicycle; Fig. 2, a top view of the machine as it appears with the steering-bar, saddle, front wheel, and part of frame-work removed. Fig. 3 is a section of the steering-bar through the line *a b*, Fig. 1. Fig. 4 is a section of the steering-bar on the line *c d*, Fig. 1. Fig. 5 is a front view of a part of the steering-bar, showing a modification of the brake arrangement. Fig. 6 is a section of the treadle-driving mechanism on the line *e f*, Fig. 1.

Similar letters refer to similar parts throughout the several views.

In Figs. 1 and 2 the large or driving wheel of the bicycle is represented by 1. This wheel revolves on the shaft 2, which is fastened in the frame-work 3. This frame-work projects above the wheel, with two arms, 4 and 5, which support a spring, 6, to which is attached the saddle 7. To the upper part of the frame-work 5, and also to another arm, 8, are attached bearings 9 and 10. In these bearings is secured the steering-bar 11, which is free to revolve. To its lower end is secured a forked bar, 12, which holds the small wheel 13 of the bicycle.

I will first describe the improved brake.

To the upper end of the steering-bar 11 is secured the handle-bar 14, having handles 15 and 16. (Seen also in Fig. 3.) Upon this handle-bar 14 is secured the pivot 17, in which is pivoted a brake-handle, 18, one end of which reaches below the handle 16, and the other end projects through an opening, 19, of the steering-bar 11 and rests upon a bolt, 20. This bolt has an enlarged head, 21, with an opening, 22, through it. In this opening 22 the upper end of the brake-lever 23 is inserted. This brake-lever is pivoted at 24 in the arm 5, and its other end reaches over the driving-wheel 1 at 25, a spring, 26, meanwhile keeping it clear from the wheel. In order that the brake-lever 23 may reach the bolt-head 21 and allow the handle-bar to be turned to the right and left for purposes of steering, an opening, 27, is cut in the steering-bar 11, sufficiently long to allow the bolt 20 to operate on the brake-lever, and sufficiently wide to allow the steering-bar 11 to revolve to the right or left about sixty degrees. In Fig. 4 the angular movement of the steering-bar 11 is indicated. It will be seen that whatever position within the one hundred and twenty degrees the handle-bar 14 may assume the brake-lever 18 is always under control from the handle 16 without letting go of the latter, and sufficient pressure may be brought to bear by the brake 25 on the wheel 1 to govern its motion or stop the machine. A modification of this brake arrangement may be seen in Fig. 5, in which a collar or slide, 28, on the outside of the steering-bar 11 takes the place of the inner bolt, 20. This collar 28, when acted upon by the brake-handle 18, presses upon the brake-lever 23 in the direction of the arrow 29, operating in the same manner as before described. Both the bolt 20 and the collar 28 may be dispensed with, if the brake-lever 23 is so modified in form and changed in position that its upper end may be acted upon directly by the inner end of the brake-handle 18.

I will now proceed with the improved treadle-driving mechanism.

In order that the rider may exert his full power in propelling the machine, I have omitted the coiled springs usually found in such driving mechanism for returning the disks to place after a treadle stroke has been made.

Referring to Figs. 1, 2, and 6, in section, the fixed shaft 2 will be seen attached to the frame-work 3 3 on either side of the machine. Upon this shaft 2 the wheel 1 revolves. This wheel is acted upon by driving-disks 30 and 31, whose internal teeth engage with pawls 32 32, held there by springs 33 33, that are fastened to ears on the hub of the wheel 1 at 34 34. The outer circumference of the ratchet disks 30 and 31 are curved spirally, as at 35 and 36, upon which spiral parts are secured straps 37 and 38, hooked to treadles 39 and 40. These treadles are pivoted in the frame of the machine at 41 and 42, and their pedals are shown at 43 and 44. The treadle 39 is shown in its lower position and the treadle 40 in its upper position, ready to be pressed down to propel the machine. In order to return the unwound disks 30 31 to place after such stroke, I connect them together in the following manner: To the spiral disks 36 a lever, 47, is attached at 48. This lever 47 is secured to a shaft, 49, passing through the fixed shaft 2 of the bicycle. (Seen also in section in Fig. 6.) Upon its farther end is fixed a bevel-gear, 50, engaging in a pinion, 51, revolving upon a stud fixed to the frame 3. This pinion meshes into another bevel-gear, 52, fastened to the disk 30. It will now be seen that when the treadle 40 is depressed rotary motion is transmitted to the bevel 50 through the axle of the machine, which motion is reversed by the other two bevels, 51 and 52, and this reverse motion is thus given to the spiral disk 35, which, revolving in the arrowed direction 53, raises the treadle 39 to its upper position ready for its work. The two treadles 39 and 40 are in this manner counterbalanced, and no power it wasted in winding return-springs. The rider can also rest his feet at any part of the stroke on both treadles, and he may thus bring his machine in balance very readily by throwing more or less weight on either pedal.

Continuing with the improved step for mounting the machine, and referring to Figs. 1, 2, and 6, it will be seen that a step, 70, is fastened to the spiral part 36 of the driving-disk 31. By placing the foot upon this step 70 in the act of mounting the machine, the whole weight of the rider will be thrown upon the driving-disk 31, and will propel the machine forward, enabling the rider to mount into the saddle, the step 70 revolving in the direction of the arrow 71 until it arrives in a position directly under the shaft 49, where it stops.

Continuing with the partially self-acting steering arrangement, and referring to Figs. 1 and 3, sheet 1, a coiled spring, 76, preferably made of square steel, is shown. This spring 76 is attached at one end to a bracket, 77, reaching out through the opening 27 of the steering-bar 11, which bracket is fixed to the bearing 10 of the machine. At the other end the spring 76 is fixed to an adjustable holder, 78, in the steering-bar 11, which holder may be held by a set-screw, 79, or by any other suitable device.

The spring 76 receives no strain when the steering-wheel 13 of the bicycle is in alignment with the large wheel 1; but when the handle-bar 14 and the steering-bar 11 are turned to the right or left the spring is wound up or uncoiled, having the effect of returning the steering-wheel in alignment when the handle and steering bar are released.

In Figs. 1 and 3 I represent a buffing arrangement to the steering-wheel 13, to take any shocks given to it. Here a buffing-spring, 104, is shown inside the steering-bar 11, pressing between an abutment, 105, and the upper end, 106, of the fork 12, that holds the steering-wheel 13. This upper end, 106, is held from turning by the key 107 passing through the steering-bar 11, and through a slot, 108, in shaft 106, which slot 108 allows of upward motion to the shaft 106, and a piece of rubber, 109, in the upper end of the slot 108 acts as a deadener of sound when the shaft 106 returns to place after any motion. By thus enabling the steering-wheel 13 to rise and fall independent of the steering-bar 11, no shocks will be transmitted to the handle-bar 14.

What I claim, and desire to secure by Letters Patent, is—

1. The combination of the handle-bar 14, the brake-handle 18, and the brake-lever 23, all combined and operating together substantially as described.

2. The combination of two disks, 30 and 31, having or not having spiral-shaped projections 35 and 36, the straps 37 and 38, the shaft 49, the bevel-gears 50 and 52, and bevel-pinion 51, all operating together, substantially as described, so that the downward motion of a treadle attached to the end of the strap 37 or 38 will operate to give an upward motion to a corresponding treadle or stirrup attached to the end of the other strap, and also vice versa.

3. The combination of the step 70, the disk 31, having or not having spiral-shaped projection 36, and the pawl 32, all operating together so that the rider, when placing his foot upon the step to mount the machine, will cause the wheel 1 to revolve, and thus propel the machine.

4. The combination of the spring 76, the bracket 77, and the holder 78, all combined and operating together substantially as described.

5. The combination of the shaft 106, the spiral spring 104, the key 107, and the steering-bar 11, all combined and operating together substantially as described.

WILLIAM A. LORENZ.

Witnesses:
CHARLES S. BARKER,
HENRY N. ROBINSON.